US010183566B2

United States Patent
Trent

(10) Patent No.: US 10,183,566 B2
(45) Date of Patent: Jan. 22, 2019

(54) HYBRID VEHICLE AND POWERTRAIN

(71) Applicant: FORD GLOBAL TECHNOLOGIES, LLC, Dearborn, MI (US)

(72) Inventor: James Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 15/214,931

(22) Filed: Jul. 20, 2016

(65) Prior Publication Data

US 2018/0022200 A1 Jan. 25, 2018

(51) Int. Cl.
| | | |
|---|---|---|
| *B60K 6/383* | (2007.10) |
| *B60K 6/387* | (2007.10) |
| *B60K 6/48* | (2007.10) |
| *F16D 41/16* | (2006.01) |
| *F16D 27/118* | (2006.01) |
| *F16D 41/08* | (2006.01) |
| *F16D 27/10* | (2006.01) |
| *F16D 41/12* | (2006.01) |
| *B60K 6/26* | (2007.10) |

(52) U.S. Cl.
CPC .............. *B60K 6/383* (2013.01); *B60K 6/387* (2013.01); *B60K 6/48* (2013.01); *F16D 27/10* (2013.01); *F16D 27/118* (2013.01); *F16D 41/084* (2013.01); *F16D 41/12* (2013.01); *F16D 41/16* (2013.01); *B60K 6/26* (2013.01); *B60K 2006/4825* (2013.01); *B60Y 2200/92* (2013.01); *B60Y 2400/427* (2013.01); *B60Y 2400/60* (2013.01); *Y10S 903/906* (2013.01); *Y10S 903/913* (2013.01)

(58) Field of Classification Search
CPC ............. B60Y 2400/60; Y10S 903/913; F16D 41/082
See application file for complete search history.

(56) References Cited

U.S. PATENT DOCUMENTS

| | | | |
|---|---|---|---|
| 8,056,663 B2 | 11/2011 | Schoenek | |
| 2009/0084653 A1* | 4/2009 | Holmes | B60K 6/365 192/41 A |
| 2012/0149518 A1* | 6/2012 | Kimes | F16H 3/728 475/5 |
| 2012/0203403 A1* | 8/2012 | Lee | B60K 6/383 701/22 |
| 2015/0080174 A1* | 3/2015 | Lee | B60W 10/02 477/5 |

(Continued)

FOREIGN PATENT DOCUMENTS

CN 102390249 A 3/2012

*Primary Examiner* — Mark A Manley
(74) *Attorney, Agent, or Firm* — David Kelley; Brooks Kushman P.C.

(57) ABSTRACT

A vehicle includes an engine, motor, transmission, and electronically controlled one-way clutch. The engine includes an output. The motor includes a rotor and a stator. The transmission includes an input that is rotatably coupled to the rotor. The transmission is configured to receive power from the engine and the motor. The electronically controlled one-way clutch has an inner race that is secured to the output of the engine and an outer race that is secured to the rotor. The electronically controlled one-way clutch is configured to rotatably couple the output to the rotor.

5 Claims, 4 Drawing Sheets

(56) References Cited

U.S. PATENT DOCUMENTS

| | | | |
|---|---|---|---|
| 2015/0152948 A1* | 6/2015 | Johnson | B60K 6/26 60/337 |
| 2015/0211583 A1 | 7/2015 | Jugovic et al. | |
| 2015/0231957 A1* | 8/2015 | Lebeau | B60K 6/40 192/55.2 |
| 2015/0285320 A1* | 10/2015 | Lloyd | F16D 41/084 192/39 |

* cited by examiner

HYBRID VEHICLE AND POWERTRAIN

TECHNICAL FIELD

The present disclosure relates to hybrid vehicles and powertrain systems for hybrid vehicles.

BACKGROUND

Hybrid vehicles may include a clutch that is configured to disengage the engine from the powertrain when the hybrid vehicle is operating in an EV mode.

SUMMARY

A vehicle includes an engine, motor, transmission, and electronically controlled one-way clutch. The engine includes an output. The motor includes a rotor and a stator. The transmission includes an input that is rotatably coupled to the rotor. The transmission is configured to receive power from the engine and the motor. The electronically controlled one-way clutch has an inner race that is secured to the output of the engine and an outer race that is secured to the rotor. The electronically controlled one-way clutch is configured to rotatably couple the output to the rotor.

A powertrain module includes a housing, input shaft, output shaft, motor, and electronically controlled one-way clutch. The input shaft extends from the housing and is configured to rotabably couple to an engine output. The output shaft extends from the housing and is configured to rotatably couple to a transmission input. The motor includes a stator that is secured to an inner surface of the housing and a rotor that is secured to the output shaft. The electronically controlled one-way clutch has an inner race that is secured to the input shaft and an outer race that is secured to the rotor. The electronically controlled one-way clutch is configured to rotatably couple the input shaft to the rotor.

An electric machine includes a stator, rotor, output shaft, input shaft, and electronically controlled one-way clutch. The rotor is disposed within the stator and is secured to the output shaft. The input shaft is disposed within the rotor. The electronically controlled one-way clutch has an inner race that is secured to the input shaft and an outer race that is secured to rotor. The electronically controlled one-way clutch is configured to rotatably couple the input shaft to the rotor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
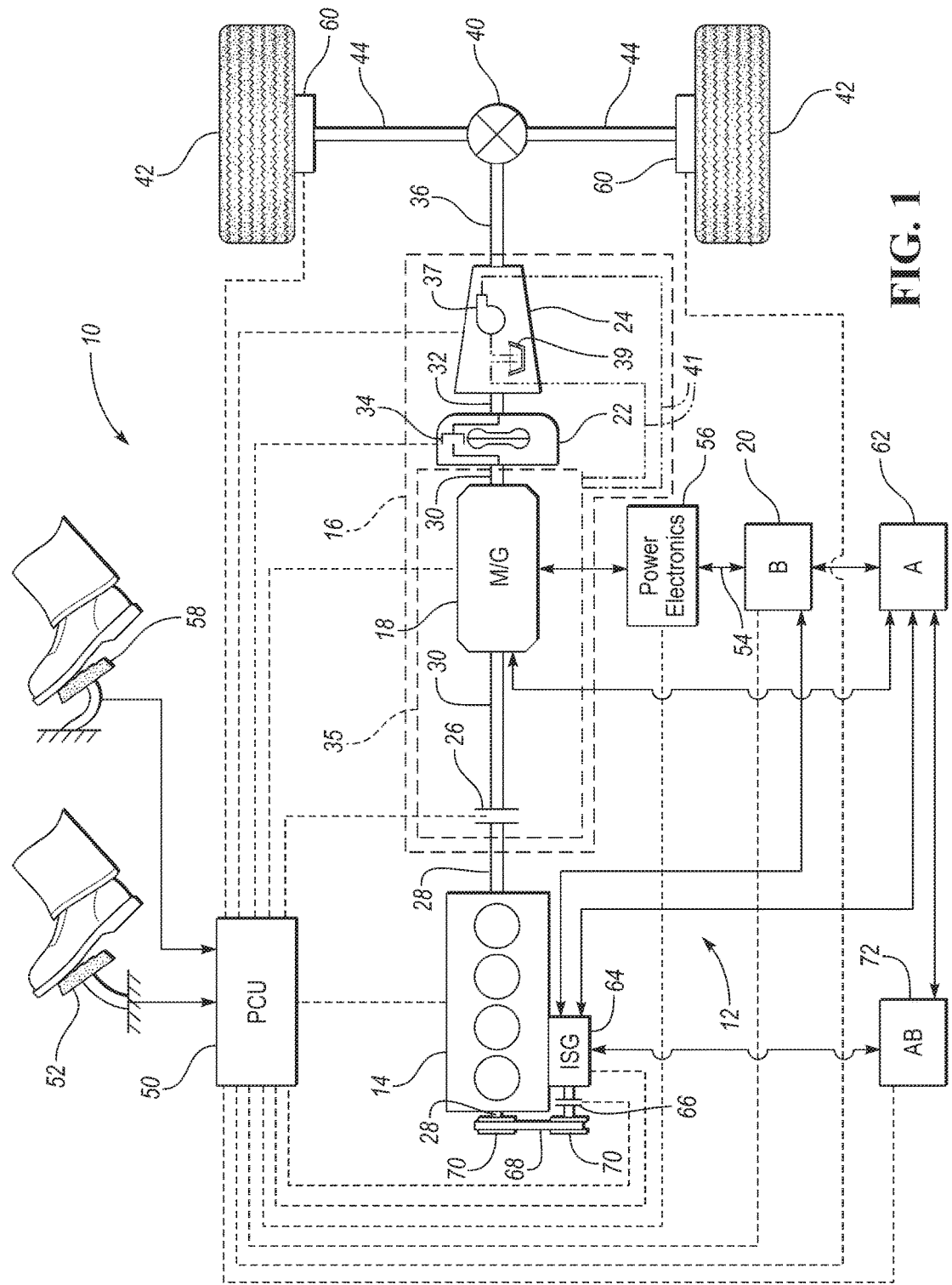
FIG. 1 is a schematic illustration of a representative powertrain of a hybrid electric vehicle.
Figure 2:
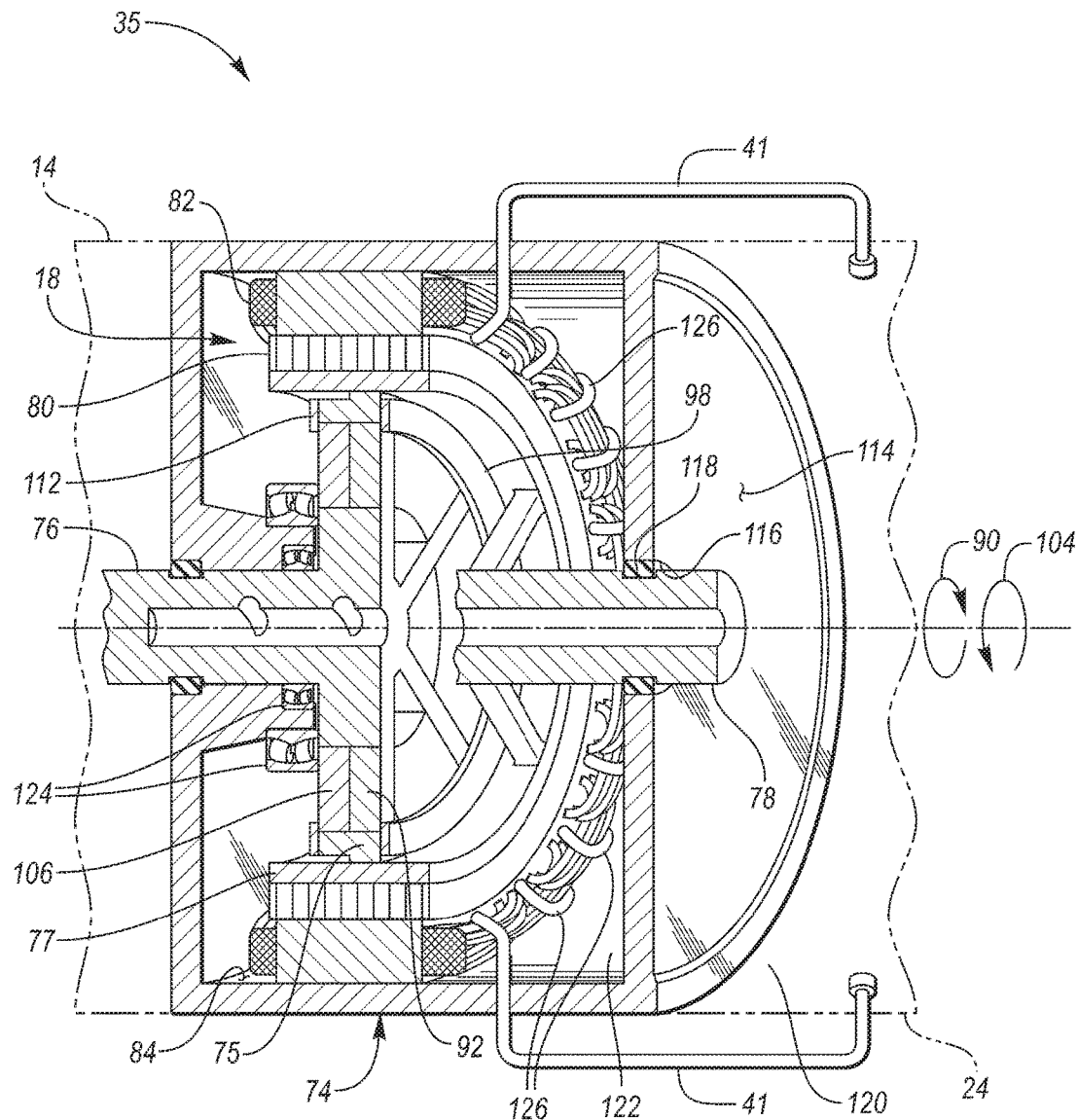
FIG. 2 is an isometric/cross-sectional view of a powertrain module that includes an engine disconnect clutch and a motor/generator.
Figure 3:
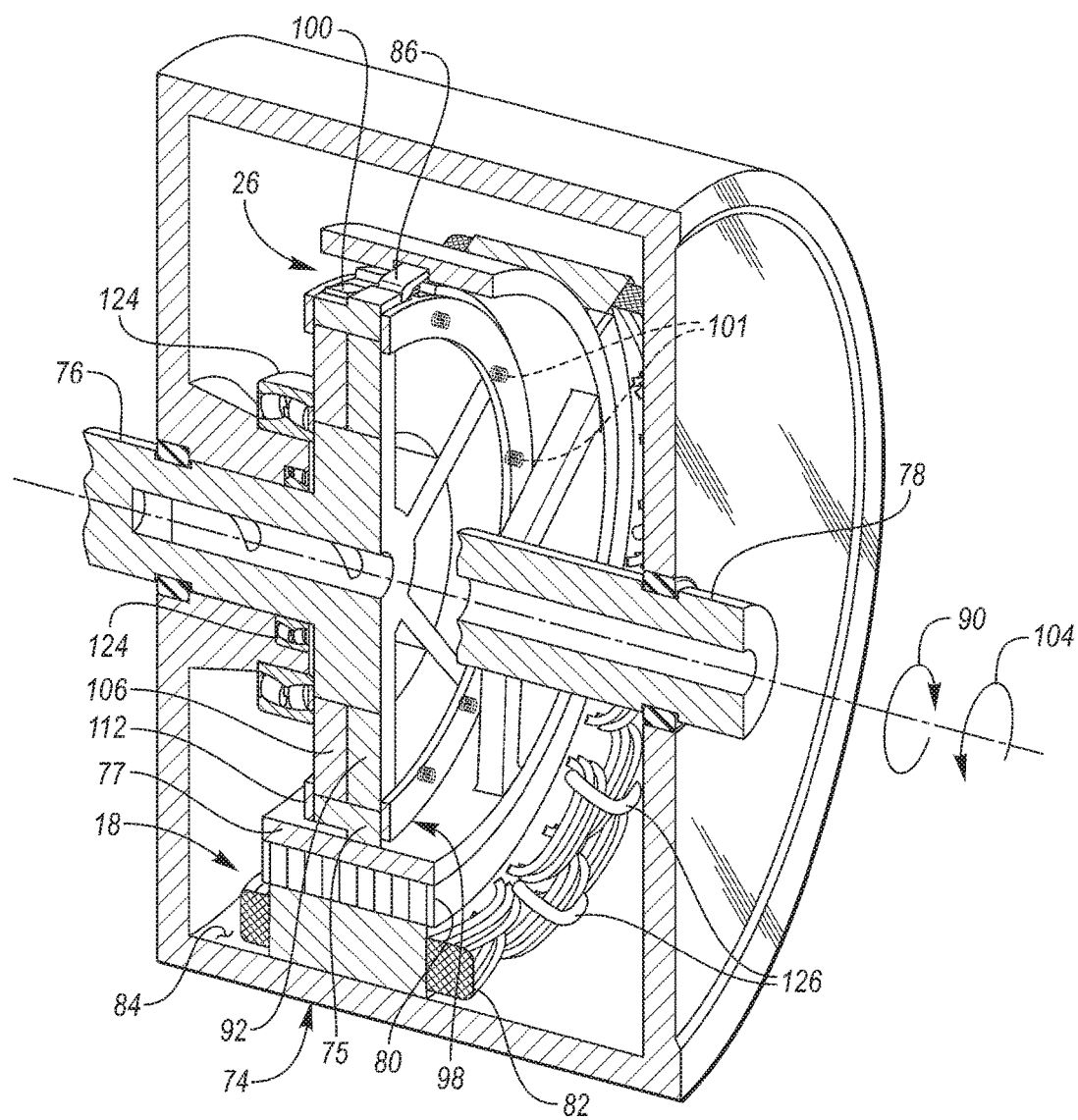
FIG. 3 is an additional isometric/cross-sectional view of the powertrain module.
Figure 4:
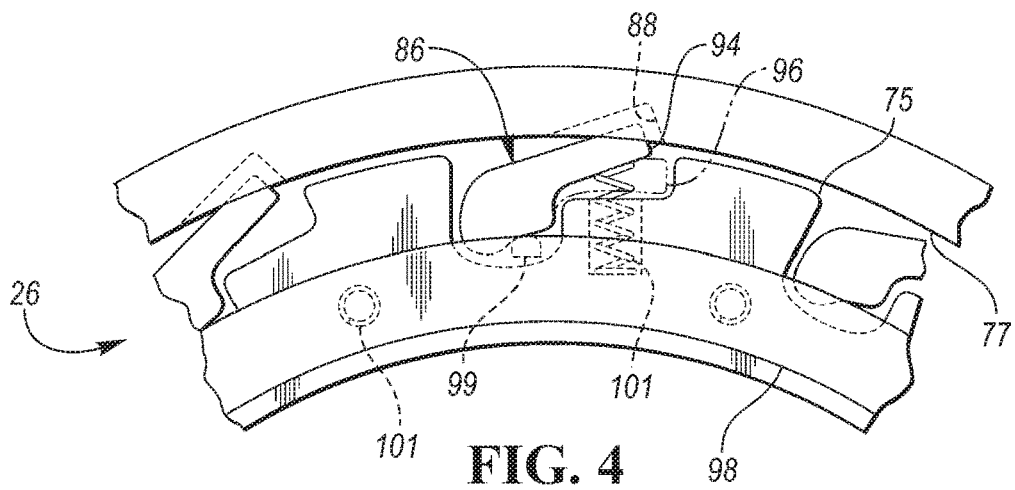
FIG. 4 is a front view of a portion of the engine disconnect clutch.
Figure 5:
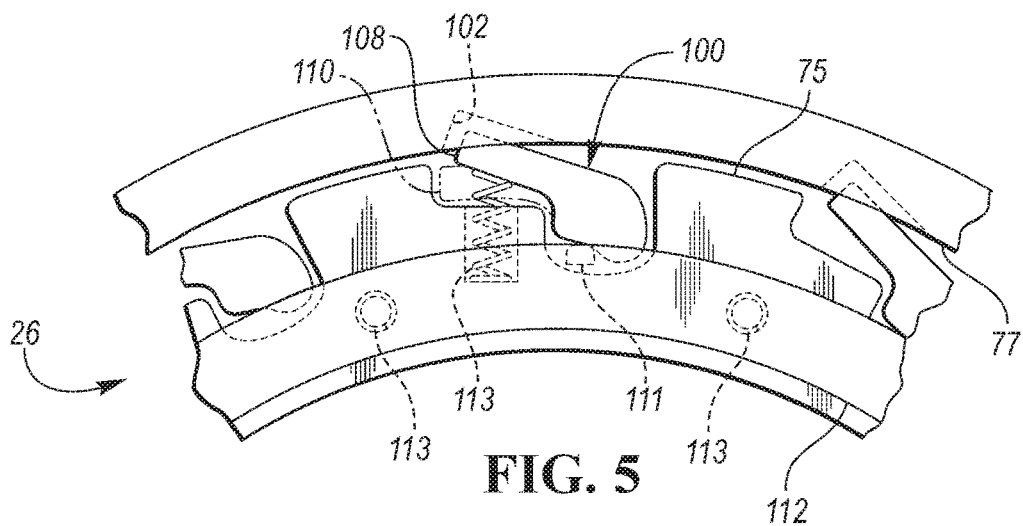
FIG. 5 is a rear view of a portion of the engine disconnect clutch.
Figure 6:
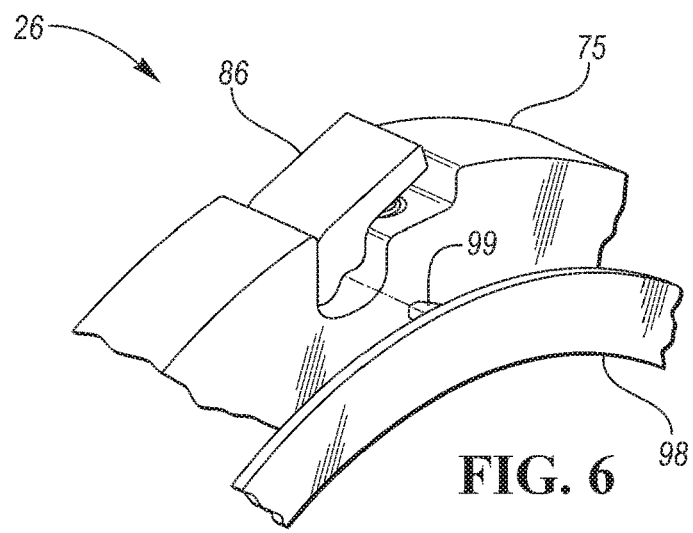
FIG. 6 is an isometric view of a portion of the engine disconnect clutch.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The disconnect clutch 26 and the M/G 18 may be disposed within a common housing or case that is located between the engine 14 and the gearbox 24. Collectively, the disconnect clutch 26, the M/G 18, and the case may be referred to as a powertrain module, or more specifically the front module 35.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

The transmission 16 may also include a pump 37 that is configured to deliver hydraulic fluid to the friction elements within the gearbox 24 and/or torque converter 22 in order to engage and disengage the various friction elements. The pump 37 may also deliver hydraulic fluid to moving elements within the gearbox 24 and/or torque converter 22 to provide lubrication. The pump 37 may be disposed within gearbox 24 and draw hydraulic fluid from a sump 39 located in the gearbox 24. Fluid channels 41 may fluidly communicate hydraulic fluid between the gearbox 24 and the front module 35. The fluid channels 41 may include a delivery line that delivers hydraulic fluid from the gearbox 24 to the front module 35 and a return line that returns hydraulic fluid to the gearbox 24 from the front module 35. More specifically, the fluid channels 41 may fluidly communicate hydraulic fluid between the transmission gearbox 24 and particular components within the front module.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Referring to FIGS. 2-6, a powertrain module and the components disposed within the powertrain module, including the engine disconnect clutch 26 and the M/G 18, are illustrated. More specifically, the powertrain module may be referred to as the front module 35. The front module 35 includes a housing (or case) 74. The engine disconnect clutch 26 and the M/G 18 are both disposed within the housing 74. The housing 74 may be adjacent to the engine 14 on a first side and adjacent to the transmission gearbox 24 on a second side. The torque converter 22 (or launch clutch in applications that do not include the torque converter) may be disposed between the front module 35 and the transmission gearbox 24. A front module input shaft 76 may extend from the exterior to the interior of the housing 74. The front module input shaft 76 may be rotatably coupled to an output of the engine 14 (i.e., the crankshaft 28) or may be an integral part of the output of the engine 14. A front module output shaft 78 (which may be the M/G shaft 30 depicted in FIG. 1) may extend from the interior to the exterior of the housing 74. The front module output shaft 78 may be rotatably coupled to the transmission input shaft 32 via the torque converter 22 (or via a launch clutch for applications that do not include a torque converter). The transmission input shaft 32 may be configured to receive power from the engine 14 and M/G 18 via the front module output shaft 78.

The M/G 18 includes both a rotor 80 and a stator 82. The rotor 80 may be disposed within a central opening of the stator 82 while the front module input shaft 76 is disposed within a central opening of the rotor 80. The rotor 80 and Stator 82 may each include magnetic cores surrounded electrical windings or coils. The stator 82 may be rigidly affixed to an inner surface 84 of the housing 74. The rotor 80 is rotatably coupled to the front module output shaft 78 and is therefore also rotatably coupled to the transmission input shaft 32 via the front module output shaft 78 and torque converter 22 (or via a launch clutch for applications that do not include a torque converter).

The engine disconnect clutch 26 may be an electronically controlled one-way clutch. The electronically controlled one-way clutch may have an inner race 75 that is secured to the front module input shaft 76. Alternatively, the inner race 75 may be an integral portion of the front module input shaft 76. The electronically controlled one-way clutch may also have an outer race 77 that is secured to the rotor 80 of the M/G 18. Alternatively, the outer race 77 may be an integral portion of the rotor 80. The electronically controlled one-way clutch is configured to rotatably couple the front module input shaft 76 to the rotor 80 when the clutch is engaged and rotatably decouple the front module input shaft 76 from the rotor 80 when the clutch is disengaged.

The electronically controlled one-way clutch may include a first set of rockers 86 that are secured to the inner race 75 of the electronically controlled one-way clutch. The first set of rockers 86 may be evenly spaced along a periphery of the inner race 75. The first set of rockers 86 may be configured to engage a first set of notches 88 in the outer race 77 of the electronically controlled one-way clutch in order to rotatably couple the front module input shaft 76 to the rotor 80 in a first direction of rotation 90. The electronically controlled one-way clutch may include a first electromagnetic coil 92 that energizes and de-energizes to transition the first set of rockers 86 between a first extended position 94 to engage the first set of notches 88 and a first retracted position 96 to disengage the first set of notches 88. The electronically controlled one-way clutch may include a first actuator plate 98 that includes a series of ramps or cams 99 that are configured to engage the first set of rockers 86. When energized and de-energized, the first electromagnetic coil 92 may adjust the position of the first actuator plate 98 such that the ramps or cams 99 engage and disengage the first set of rockers 86 to transition the first set of rockers 86 between the first extended position 94 and the first retracted position 96. A first series of springs 101 may adjust the positions of the first actuator plate 98 and/or the first set of rockers 86 such that the first set of rockers are in the desired position corresponding to de-energizing the first electromagnetic coil 92.

The electronically controlled one-way clutch may include a second set of rockers 100 that are secured to the inner race 75 of the electronically controlled one-way clutch. The second set of rockers 100 may also be evenly spaced along the periphery of the inner race 75. The second set of rockers 100 may be configured to engage a second set of notches 102 in the outer race 77 of the electronically controlled one-way clutch in order to rotatably couple the front module input shaft 76 to the rotor 80 in a second direction of rotation 104. The electronically controlled one-way clutch may include a second electromagnetic coil 106 that energizes and de-energizes to transition the second set of rockers 100 between a second extended position 108 to engage the second set of notches 102 and a second retracted position 110 to disengage the second set of notches 102. The electronically controlled one-way clutch may include a second actuator plate 112 that includes a series of ramps or cams 111 that are configured to engage the second set of rockers 100. When energized and de-energized, the second electromagnetic coil 106 may adjust the position of the second actuator plate 112 such that the ramps or cams engage and disengage the second set of rockers 100 to transition the second set of rockers 100 between the second extended position 108 and the second retracted position 110. A second series of springs 113 may adjust the positions of the second actuator plate and/or the second set of rockers 100 such that the second set of rockers are in the desired position corresponding to de-energizing the second electromagnetic coil 106.

The housing 74 may include a rear wall 114 that includes an orifice 116. The front module output shaft 78 may extend through the orifice 116. A seal 118 may be disposed between the front module output shaft 78 and the rear wall 114 to prevent fluid from flowing from an external side of the rear wall 120 to an internal side of the rear wall 122. More specifically, the rear wall 114 and the seal 118 fluidly isolate the internal components of the front module 35 from the transmission gearbox 24 and/or torque converter 22, including the rotor 80, stator 82, disconnect clutch 26, front module input shaft 76, etc. in order to prevent transmission fluid from entering the housing 74 of the front module. Bearings 124 that support the rotor 80 and the front module input shaft 76 may be sealed bearings that require no additional lubrication after installation.

The fluid channels 41 may fluidly communicate hydraulic fluid between the transmission gearbox 24 and the stator 82. The fluid channels 41 may deliver hydraulic fluid to cooling pipes 126 that are disposed adjacent to various components of the stator 82. More specifically, the cooling pipes 126 may be disposed adjacent to the windings or coils of the stator 82 and may be configured to remove heat from the windings or coils of the stator 82 when hydraulic fluid is delivered to the cooling pipes 126. The cooling pipes 126 may be disposed about the windings or coils of the stator in a coiled or snaking configuration. The fluid channels 41 and cooling pipes 126 may be sealed such the hydraulic fluid is prevented from entering the cavity of the housing 74 where the various components (e.g., rotor 80, disconnect clutch 26, etc.) are disposed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine having an output;
   a motor having a rotor and a stator;
   a transmission having an input rotatably coupled to the rotor and configured to receive power from the engine and motor; and
   an electronically controlled one-way clutch having,
      an inner race that is secured to the output,
      an outer race that defines a first set of notches and is secured to the rotor,
      a first set of rockers secured to the inner race, configured to engage the first set of notches in first extended positions to rotatably couple the output to the rotor in a first direction of rotation, and configured to disengage the first set of notches in first retracted positions to rotatably decouple the output from the rotor in the first direction of rotation,
      a first set of cams configured to advance axially along an axis of rotation of the one-way clutch to engage and transition the first set of rockers to the first extended positions and to retract axially along the axis of rotation of the one-way clutch to disengage and transition the first set of rockers to the first retracted positions, wherein the first set of cams are secured to and extend perpendicular from a first actuator plate,
      a first coil that energizes and de-energizes to advance and retract the first actuator plate and the first set of cams axially relative to the axis of rotation of the one-way clutch,
      a second set of rockers secured to the inner race, configured to engage a second set of notches defined in the outer race in second extended positions to rotatably couple the output to the rotor in a second direction of rotation that is opposite of the first direction of rotation, and configured to disengage the second set of notches in second retracted positions to rotatably decouple the output from the rotor in the second direction of rotation,
      a second set of cams configured to advance axially relative to the axis of rotation of the one-way clutch to engage and transition the second set of rockers to the second extended positions and to retract axially along the axis of rotation of the one-way clutch to disengage and transition the second set of rockers to the second retracted positions, wherein the second set of cams are secured to and extend perpendicular from a second actuator plate, and
      a second coil that energizes and de-energizes to advance and retract the second actuator plate and the second set of cams axially relative to the axis of rotation of the one-way clutch.

2. The vehicle of claim 1, further comprising a case disposed between the engine and the transmission that houses the motor and fluidly isolates the rotor from the transmission.

3. The vehicle of claim 2, further comprising channels in fluid communication with the stator and the transmission, wherein the channels are configured to direct transmission fluid to the stator to cool stator coils.

4. The vehicle of claim 1, wherein the first set of cams advance axially relative to the axis of rotation of the one-way clutch and into a first set of voids defined below the first set of rockers to engage and transition the first set of rockers to the first extended positions.

5. The vehicle of claim 1, wherein the second set of cams advance axially relative to the axis of rotation of the one-way clutch and into a second set of voids defined below the second set of rockers to engage and transition the second set of rockers to the second extended positions.

* * * * *